March 27, 1928.

E. BASEMAN 1,664,102

CUTTER BAR ADJUSTING MECHANISM FOR MOWING MACHINES

Filed Sept. 4, 1924    2 Sheets-Sheet 1

Inventor
Ernest Baseman
by Popp & Powers
Attorneys

March 27, 1928. 1,664,102
E. BASEMAN
CUTTER BAR ADJUSTING MECHANISM FOR MOWING MACHINES
Filed Sept. 4, 1924 2 Sheets-Sheet 2
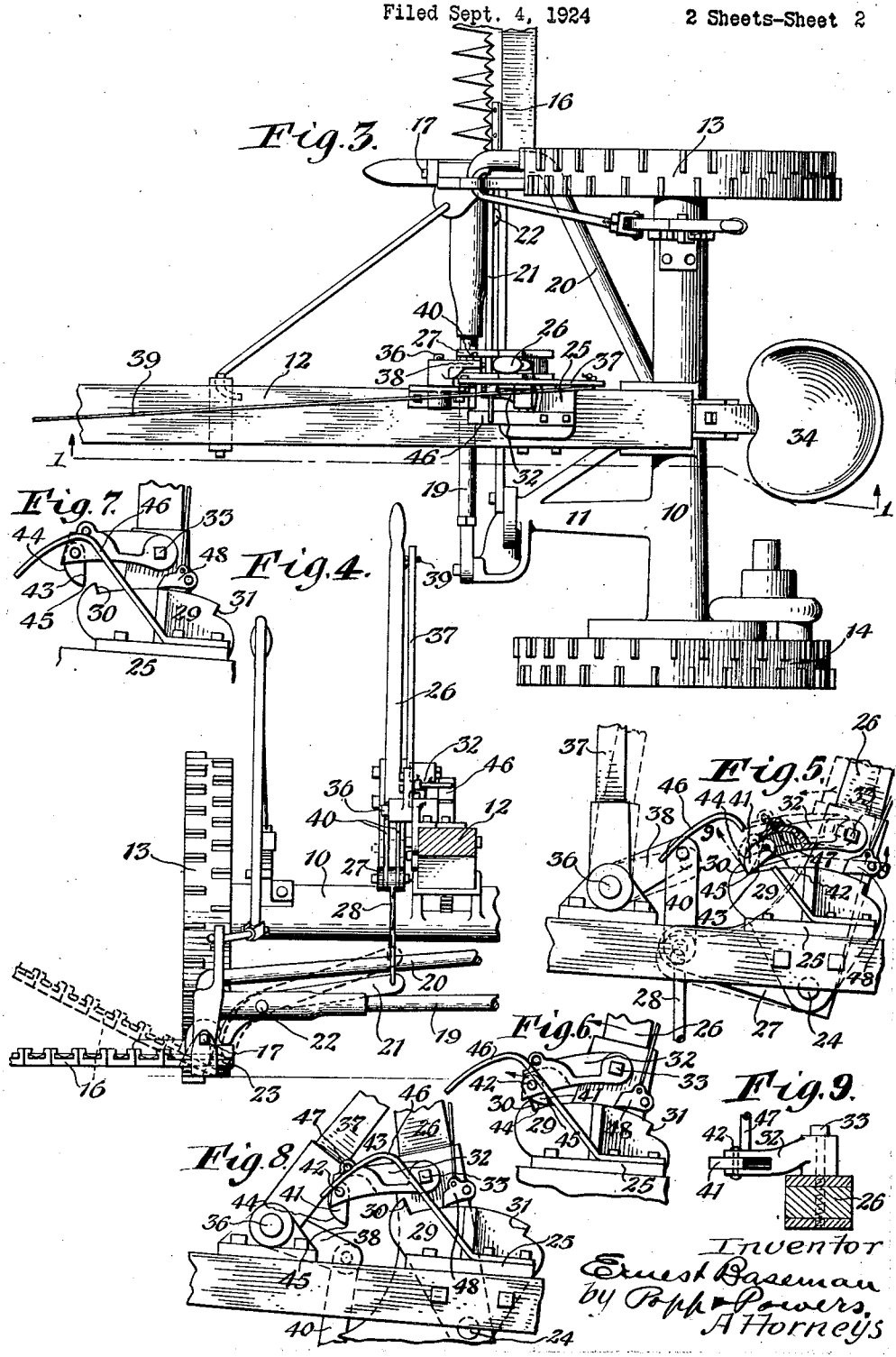
Inventor
Ernest Baseman
by Popp & Powers,
Attorneys Patented Mar. 27, 1928.

1,664,102

UNITED STATES PATENT OFFICE.

ERNEST BASEMAN, OF BATAVIA, NEW YORK, ASSIGNOR TO MASSEY-HARRIS HARVESTER COMPANY, INC., OF BATAVIA, NEW YORK, A CORPORATION OF NEW YORK.

CUTTER-BAR-ADJUSTING MECHANISM FOR MOWING MACHINES.

Application filed September 4, 1924. Serial No. 735,918.

This invention relates to means for controlling the lift of a mower cutter bar by the driver of a tractor which is pulling the mower.

Heretofore it has been necessary for the driver of a tractor to leave the latter and go to the mower for lifting the cutter bar of the mower when this became necessary to clear a stump, mound or other elevation on the field which is not only inconvenient but also objectionable on account of the loss of time and labor.

It is the object of this invention to provide means which permit the driver of a tractor without leaving his seat, to effect the raising and lowering of the cutter bar of the mower which is being hauled by the tractor and thus enable stumps and other obstructions in the field to be cleared by the cutter bar quickly, conveniently and without loss of time or stopping the propulsion of the tractor and the mower.

I attain these objects by the mechanism illustrated in the accompanying drawings in which—

Figure 3, is a top plan view of the mower, corresponding to Figure 1.

Figure 4, is a vertical transverse section taken on the correspondingly numbered line in Figure 1.

Figure 5, is a fragmentary side elevation partly in section and on an enlarged scale, of the locking mechanism of the cutter bar showing the position of the parts when the same are about to be released to permit the cutter bar to drop into its lowered operative position.

Figure 6, is a similar view showing the position of the locking mechanism when the cutter bar has effected the initial part of its return movement to its normal position.

Figure 7, is a similar view showing the position of the locking mechanism when the cutter bar has nearly completed its movement into its lowermost position.

Figure 8 is a similar view, on an enlarged scale, showing the position of the parts of the locking mechanism when the cutter bar has reached its lowermost position, corresponding to Figure 1.

Figure 9, is a fragmentary horizontal section taken on line 9—9 Figure 5.

Similar numerals refer to like parts throughout the several views.

Figure 1:
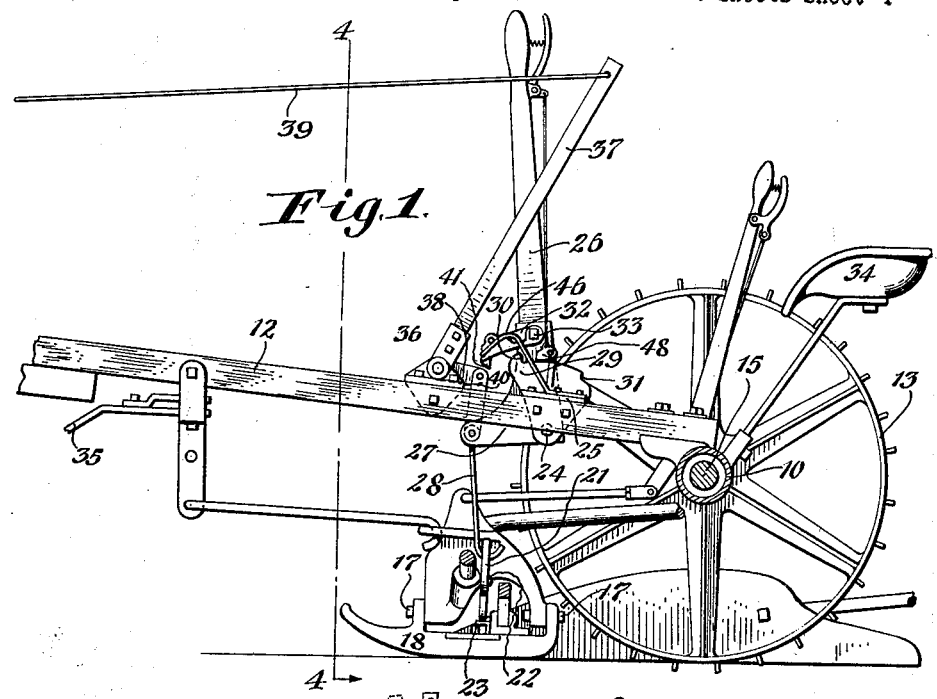
Figure 1, is a vertical longitudinal section of a mowing machine equipped with my invention and showing the parts in the position which they occupy when the cutter bar is in its lowered or operative position; taken on line 1—1, Figure 3.

The main frame of the mower shown in the drawings as an example of one suitable to receive this improvement comprises a transverse axle housing 10, a bracket 11 projecting forwardly from the stubbleward part of this axle housing and a longitudinal draft pole or beam 12 connected at its rear end with the central part of the axle housing. This frame is supported on its opposite sides by the usual wheels 13, 14, which are mounted on the opposite ends of the axle 15, journaled in the axle housing.

Arranged in front of the right or grainward wheel 13 and projecting laterally from the main frame is the cutter bar 16 of the mower upon which is mounted the usual means for cutting the stalks or crops as the mower passes over the same. This cutter bar is mounted so that its outer end can be lowered into a horizontal operative position on the ground or elevated into an intermediate inclined position for passing over stumps, stones, mounds and other obstructions on the field, or raised into its uppermost inoperative position to facilitate rapid transportation of the mower from place to place when the same is not in use. For this purpose the cutter bar is pivoted at its inner end by a horizontal longitudinal pin 17 to the shoe 18 which runs on the ground in advance of the grainward wheel 13 and connected by a transverse rod 19 and an inclined rod 20 with the main frame.

Raising and lowering of the cutter bar is effected in the present instance by an intermediate or gag lever 21 pivoted by a horizontal longitudinal pin 22 to the transverse rod 19 and engaging its outer arm with the top of a heel 23 on the cutter bar inside of the pivot 17; a main lifting lever pivoted by a horizontal transverse pin 24 on a bracket 25 carried by the pole and having an upright handle or arm 26 and a forwardly projecting lower horizontal arm 27, and a link 28 connecting the lower arm of the lifting lever with the inner arm of the gag lever. On the upper side of the bracket 25 the same is provided with a locking segment 29 the upper edge of which is provided with a front shoulder 30 and a rear shoulder 31 arranged one behind the other and both facing rearwardly. On the adjacent part of the lifting lever is mounted a locking pawl, latch or dog 32 whereby the cutter bar is adapted to be held in an elevated position. This pawl is pivoted to swing vertically by a horizontal transverse pin 33 connecting the rear end of this pawl with the upright arm of the lifting lever. When the latter is in its foremost position the pawl 32 has its front end arranged in front of the locking segment and the cutter bar is in its fully lowered operative position, as shown by full lines in Figures 1, 3, 4 and 8. Upon moving the upright arm of the lifting lever backwardly to its intermediate position the cutter bar will be raised into an intermediate inclined position, as shown by dotted lines in Figure 4, which permits the cutter bar to pass over obstructions. When the cutter bar and lifting lever are in the last mentioned position the same are held in place by engagement of the front end of the locking pawl with the front stop shoulder 30 of the locking segment. Upon moving the upright arm of the lifting lever into its rearmost position the cutter bar is raised into its highest position ready for transportation and may be held in this position by engagement of the front end of an auxiliary locking pawl 48 with the rear shoulder 31 of the locking segment. Upon releasing the locking pawl from either of the shoulders of the segment the upright arm of the lifting lever may be again moved into its foremost position and the cutter bar lowered into its operative position. When the mower was propelled by a draft animal hitched to the same as has been the custom heretofore, the shifting of the lifting lever was effected by the driver while occupying the seat 34 on the mower frame and within convenient reach of this lever.

Since, however, tractors have come into use for hauling the mower over the field the driver occupies a seat on the tractor and the lifting lever is no longer within convenient reach, and in the absence of any other provision it has been necessary for the driver to leave the tractor and go to the mower whenever the cutter bar had to be inclined into an intermediate position to permit of passing over an obstruction of the character described.

Inasmuch as no claims are made for any feature of the tractor only the draft bar 35 or the rear part of the same is shown to which the front end of the pole of the mower is connected in any suitable manner.

For the purpose of enabling the driver while occupying the seat of the tractor or some place in advance of the mower to operate the cutter bar so as to raise the same into its obstruction clearance position, lock the same in this position and again release the cutter bar and lower the same into its operative position the following means are provided:—

Mounted on the mower pole so as to swing fore and aft is a pull lever which is connected thereto by a horizontal transverse pin 36 and which has an upper upright front arm 37 and a horizontal rearwardly projected rear arm 38. To the front arm 37 is connected the rear end of a pull line 39 which extends forwardly to a place within reach of the driver while the latter is occupying a seat on the tractor. The rear arm of the pull lever is connected by an upright link 40 with the lower front arm of the main lifting lever so that upon moving the upper arm of the pull lever forwardly the gag lever will be operated for lifting the cutter bar and the upper arm of the main lifting lever will be moved rearwardly together with the locking pawl mounted thereon.

On the front end of the locking pawl is mounted a releasing finger or tongue 41 which latter is pivoted at its rear end to the pawl by a horizontal transverse pin 42 so that this finger can swing fore and aft in a vertical plane. The underside of the front end of this finger has a flat face 43, while the upper side of the same has a rounded face 44 thereby forming a comparatively sharp lower front corner 45 on this finger, as shown for example in Figure 7. When the cutter bar is in its lowermost position and the lifting lever in its foremost position the releasing finger is arranged in front of the locking segment and hanging by gravity in a pendant position therefrom, as shown in Figures 1, and 8. If now the operator wishes to raise the cutter bar in its intermediate or obstruction clearing position the pull line is drawn forwardly manually to a sufficient extent for this purpose whereby the main lifting lever is simultaneously moved rearwardly from the foremost position shown by full lines in Figure 1, to the intermediate position shown by full lines in Figure 2. When the lifting lever reaches this position the front end of the locking pawl drops with its front end behind the front shoulder 30 of the locking segment so as to hold this lever against immediate return forward movement and thereby hold the cutter bar in its partly elevated or obstruction clearing position, as shown by dotted lines in Figure 4 and by full lines in Figure 2. At this time the releasing finger is tilted upwardly and rests on the edge of the locking segment immediately in front of the front shoulder 30 thereof, as shown in Figure 2.

Figure 2:
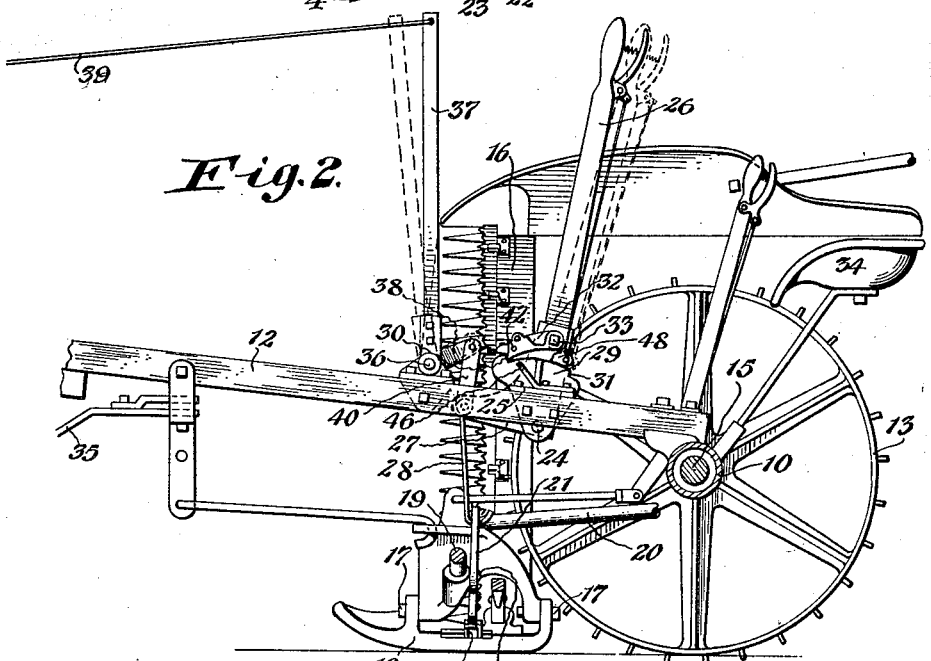
Figure 2, is a similar view, showing the position of the parts when the cutter bar is elevated to clear an obstruction.

Whenever the attendant desires to again lower the cutter bar into its operative position he first produces a short forward pull on the line 39 so as to cause a continued rearward movement of the upper arm of the lifting lever for a short distance from the position shown by full lines in Figure 2, to the position shown by dotted lines in same, whereby the releasing finger is caused to move rearwardly sufficiently to drop with its free front end upon the edge of the locking segment in rear of the front shoulder thereof, as shown by full lines in Figure 5. Upon now releasing the forward pull on the line 39 the weight of the cutter bar will cause the same to drop by gravity to its lowermost or operative position without interference from the locking device inasmuch as during this time the lifting lever moves forwardly and the releasing finger, by engaging its front end with the front shoulder 30 of the locking segment will cause this finger and pawl to fold relatively to each other with a buckling or toggle action, as indicated by dotted lines in Figure 5, and thus elevate the pivotal joint between the finger and pawl sufficiently to carry the front end of the pawl above the front shoulder, as indicated by dotted lines in this figure so that this pawl can trip forwardly past the front shoulder and thus enable the cutter bar to descend fully. After the releasing finger has thus raised the front end of the pawl to clear the front shoulder 30, this end, during the subsequent forward movement of the pawl first causes a continued buckling or folding action of the finger and pawl and a carrying of the front end of the pawl over the elevated edge portion of the segment in front of the shoulder 30, as shown by full lines in Figure 6, and during the last part of the forward movement of the pawl the same drags the finger forwardly out of the engagement from the shoulder 30 and carries the same to a place in front of the segment where the finger again assumes its normal pendant position by gravity, preparatory to effecting another rearward movement for locking the cutter bar in its elevated obstruction clearing position.

From the foregoing it will be clear that when it is desired to raise the cutter bar to clear an obstruction it is only necessary to pull forwardly on the line 39 and if it is desired to lock the cutter bar in this position this movement must be sufficient to permit the front end of the pawl to drop immediately behind the front shoulder 30, whereupon the pull on the line may be discontinued but the cutter bar will be held in its obstruction clearing, elevated position. Upon a further forward pull on the line 39 the releasing finger will be brought into action so that upon discontinuing the pull on the line the pawl will be automatically unlatched from the segment and permitted to move into its foremost inoperative position and allow the cutter bar to drop without any further attention on the part of the operator.

In very rare instances the forward movement of the pawl and finger are liable to be arrested just after the finger has been dragged slightly forward from the front shoulder 30 after leaving the position of the parts shown in Figure 6, which condition is liable to occur in case the operator effects a final pull on the line and then releases this pull just when the cutter bar is over a mound or obstruction. Under these circumstances the finger is liable to be folded or doubled up against the underside of the pawl, and held in this position by engagement with the edge of the segment in front of the front shoulder. If at this time the operator should pull forwardly on the line and move the pawl rearwardly the finger would still remain in a rearwardly folded position underneath the pawl and thus prevent these fingers from serving as a toggle to lift the pawl forwardly over the front shoulder upon releasing the forward pull on the line. In the absence of any provision to overcome a situation of this kind the cutter bar would be held locked in its elevated position and would require the attendant to leave the tractor and go back to the mower and reset the releasing finger into its normal position. To avoid such an occurrence a lifting cam 46 is mounted on the adjacent part of the main frame and in the path of a lifting pin 47 on the pawl, as shown in Figures 1, 2, 5 to 8. The relation of this pin and cam is such that immediately after the releasing finger has by its toggle action raised the front end of the pawl sufficiently to pass forwardly over the front shoulder 30, as shown in Figure 6, then the pin 47, during the continued forward movement of the pawl will engage with the inclined rear wall of the cam and be raised by the latter a short distance beyond the maximum lifting effect of the releasing finger so that the latter is raised clear of the segment and permitted to move into a pendant position in front of the segment, as shown in Figure 7, and to remain in this position to the end of its forward movement, as shown in Figures 1 and 8. By this means the finger is prevented from being cramped in a rearwardly folded position between the underside of the pawl and the edge of the segment in front of the shoulder 30 in the event that the cutter bar should be lowered just when the same is passing a mound or elevated obstruction and the finger has not yet fully cleared the segment in its forward movement. Positive operation of latching the cutter bar in its elevated position and unlatching the same from a place remote from the mower is therefore insured under all circumstances so that at no time is the driver obliged to leave his seat on the tractor for this purpose, thereby enabling mowing of the field to be effected more expeditiously, comfortably and economically.

I claim as my invention:—

1. A mower comprising a main frame, a vertically swinging cutter bar pivotally mounted on said frame, a lever pivotally mounted on said frame and operatively connected with said cutter bar, and means for locking said lever in position when the cutter bar is raised to an inoperative position comprising a bracket mounted on said frame and having a shoulder, a pawl pivotally mounted on said lever and adapted to engage said shoulder upon moving said lever in the direction for lifting the cutter bar, and a releasing finger movably mounted on said pawl and adapted to move past said shoulder upon shifting said lever further in the direction for raising said cutter bar and to engage said shoulder and cause the pawl to clear said shoulder as the lever moves in the opposite direction for lowering said cutter bar.

2. A mower comprising a main frame, a vertically swinging cutter bar pivotally mounted on said frame, a lever pivoted on said frame and operatively connected with said cutter bar, and means for locking said lever in position when the cutter bar is raised to an inoperative position and releasing the same including a bracket arranged on said frame and having a rearwardly facing locking shoulder, a locking pawl connected at its rear end by a horizontal transverse pivot with said lever and adapted to engage said shoulder upon moving said lever rearwardly for raising the cutter bar, and a releasing finger pivotally connected at its rear end by a horizontal transverse pivot with the front end of said pawl and adapted to move rearwardly past said shoulder upon shifting said lever further rearwardly and to engage said shoulder and thereby cause said finger and pawl to double upon each other with a toggle action, whereby the front end of the pawl is lifted over said shoulder during the return movement of the latter.

3. A mower comprising a main frame, a vertically swinging cutter bar pivotally mounted on said frame, a lever pivoted on said frame and operatively connected with said cutter bar, and means for locking said lever in position when the cutter bar is raised to an inoperative position and releasing the same including a bracket arranged on said frame and having a rearwardly facing locking shoulder, a locking pawl connected at its rear end by a horizontal transverse pivot with said lever and adapted to engage said shoulder upon moving said lever rearwardly for raising the cutter bar, a releasing finger pivotally connected at its rear end by a horizontal transverse pivot with the front end of said pawl and adapted to move rearwardly past said shoulder upon shifting said lever further rearwardly and to engage said shoulder and thereby cause said finger and pawl to double upon each other with a toggle action, whereby the front end of the pawl is lifted over said shoulder during the return movement of the latter, and a cam arranged on the main frame and adapted to lift said pawl clear of said shoulder during the return movement of said lever for lowering the cutter bar.

4. A mower comprising a main frame, a vertically swinging cutter bar pivotally mounted on said frame, a lever pivoted on said frame and operatively connected with said cutter bar, and means for locking said lever in position when the cutter bar is raised to an inoperative position and releasing the same including a bracket arranged on said frame and having a rearwardly facing locking shoulder, a locking pawl connected at its rear end by a horizontal transverse pivot with said lever and adapted to engage said shoulder upon moving said lever rearwardly for raising the cutter bar, a releasing finger pivotally connected at its rear end by a horizontal transverse pivot with the front end of said pawl and adapted to move rearwardly past said shoulder upon shifting said lever further rearwardly and to engage said shoulder and thereby cause said finger and pawl to double upon each other with a toggle action, whereby the front end of the pawl is lifted over said shoulder during the return movement of the latter, a lifting pin arranged on the side of said pawl at the front end thereof, and a lifting cam arranged on the main frame and adapted to be engaged by said lifting pin for raising said pawl with its front end clear of said shoulder during the return movement of said lever when lowering the cutter bar.

ERNEST BASEMAN.